Jan. 31, 1967 A. S. KATZEL 3,302,011

PORTABLE TELEPHONE SWITCHBOARD LIGHT

Filed Dec. 22, 1964

INVENTOR.
ABRAHAM S. KATZEL
BY
Walter F. Wessendorf, Jr.
attorney

United States Patent Office 3,302,011
Patented Jan. 31, 1967

3,302,011

PORTABLE TELEPHONE SWITCHBOARD LIGHT

Abraham S. Katzel, 655 Park Ave., Albany, N.Y. 10007
Filed Dec. 22, 1964, Ser. No. 420,272
1 Claim. (Cl. 240—4)

This invention relates to a portable light utilized to illuminate the plug-in-board of a telephone switchboard.

Telephone companies do not permit any source of illumination to be either mechanically affixed to or electrically connected to the switchboard. The result is inadequate illumination of the plug-in-board before which the telephone operator is seated and handles incoming and outgoing telephone calls. Illumination of the plug-in-board is provided either by lighting fixtures ceiling mounted or suspended, illumination provided from lamps in lateral position relative to the switchboard and directed toward the plug-in-board or by combinations of such described illumination. Depending on the positions of the ceiling lighting fixtures relative to the plug-in-board, the illumination provided thereby is either of insufficient intensity and therefore does not provide sufficient illumination, or is of sufficient intensity but results in casting of the telephone operator's shadow upon the plug-in-board or results in glare to her eyes when she raises same in the course of her "plugging" operation at the upper portion of the plug-in-board. In the situation of illumination provided from the laterally positioned lamps, the results are glare to the operator's eyes, shadows and "hot spots" on the plug-in-board. These problems, as discussed, result in eye strain for the operator along with a decrease in her functional efficiency.

The object of this invention is to solve the discussed problems by providing a portable light that can be adjustably positioned relative to the plug-in-board with its illumination directed at the plug-in-board—away from the operator's eyes—and where the illumination is needed.

Although this invention is described for use with a telephone switchboard, it should be appreciated that this description is by way of example only and not by way of limitation of use. As a further example, this invention can be utilized to provide illumination of the sheet music on a piano.

This object and other objects of the invention should be discerned and appreciated from the following detailed specification taken in conjunction with the drawings, wherein like reference numerals refer to similar parts throughout the several views, in which.

Figure 1:
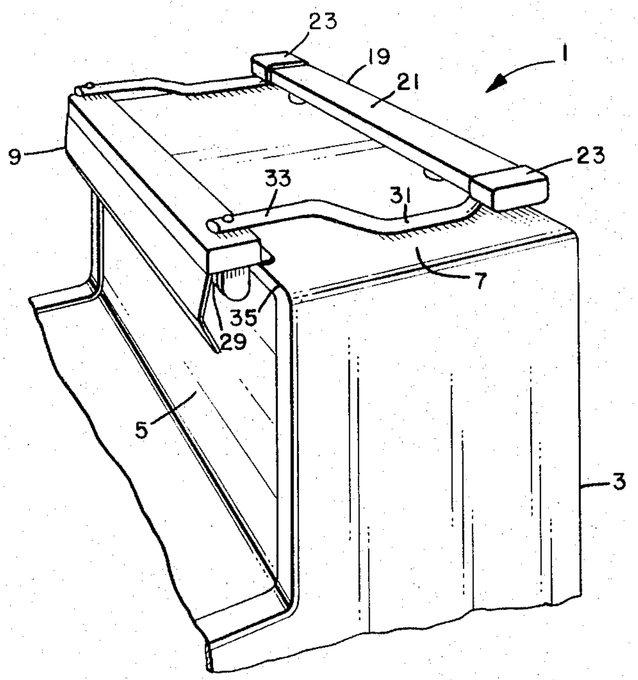
FIG. 1 is a perspective view of the invention shown emplaced in position on a conventional telephone switchboard and wherein the fluorescent bulb is depicted as directed at the plug-in-board.
Figure 2:
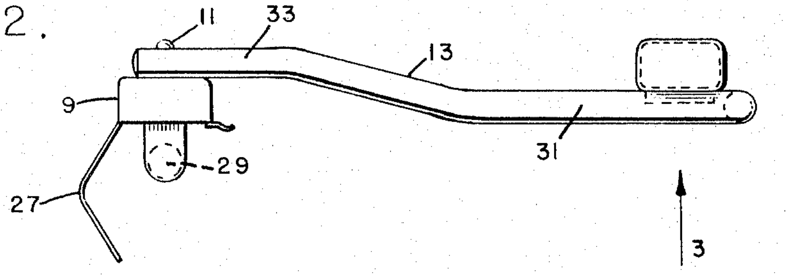
FIG. 2 is a view of the invention in orthographic projection.
Figure 3:
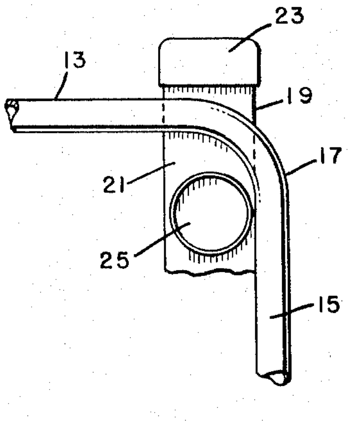
FIG. 3 is a fragmentary view in the direction indicated by the arrow 3 in FIG. 2.

In FIG. 1 reference numeral 1 generally refers to the invention shown freely mounted on the telephone switchboard 3 having a plug-in-board 5 and a top portion 7 which is flat similar to a table top.

The portable light 1 comprises a fluorescent lighting fixture 9 secured by nuts 11 and bolts (not shown) to legs 13 which depend from main web 15 of tubular fixture support 17, and emplaced upon support 17 is an adjustably positionable weight 19 comprising a duct 21 of rectangular shape in cross-section and end caps 23. Cylindrical funnels 25 communicate interiorly of duct 21 and function also as positioning guides for weight 19 when same is emplaced upon support 17.

Weight 19 is formed by standing each end cap 23 angularly on end with its associated funnel 25 upwardly positioned, then pouring five pounds of melted lead in that funnel, allowing the melted lead to collect and cool in that end cap, such that by this method five pounds of lead will be positioned in the areas of the end caps 23 and the end caps will be secured to duct 21.

A steel bar of configuration similar to weight 19 is not preferred because such a steel bar would weigh some twenty pounds or more, would be more expensive than weight 19 and would be difficult for a female telephone operator to handle and move.

Angle reflector 27 in fixed relationship and depending from lighting fixture 9 directs illumination from fluorescent bulb 29 at and upon the surface of plug-in-board 5 without resulting glare.

Each of the legs 13 has a lower portion 31 articulating angularly upward to an upper portion 33 with the resulting dimensional height therebetween forming a clearance space which permits the fluorescent bulb 29 to be positioned non-interferingly proximate the leading edge 35 formed by the top portion 7 and plug-in-board 5. The lower portions 31 of legs 13 and main web 15 are coplanar, and thereby form a base for mounting the portable light 1 on the top portion 7 of the telephone switchboard 3.

In utilizing the invention, the telephone switchboard operator positions suitably fluorescent bulb 29 relative to the plug-in-board 5 by appropriate disposition of the base on the top portion 7 and then emplaces weight 19 upon support 17 by use of the funnels 25 as guides.

Having thusly described my invention, I claim:

In combination, a conventional telephone switchboard and a portable telephone switchboard light mounted freely thereon; said telephone switchboard comprising a plug-in-board, a top portion and a leading edge formed by said plug-in-board and top portion; said portable telephone switchboard light comprising a fluorescent lighting fixture, a tubular fixture support, and a weight; said fixture support having a main web and legs, each of said legs having a lower portion and an upper portion articulating angularly upward from said lower portion, said main web and lower portions being coplanar and forming a base freely mounting said portable telephone switchboard light on said top portion, said upper and lower portions forming a clearance space for positioning said lighting fixture non-interferingly proximate said leading edge, said weight being freely mounted on said fixture support and adjustably positionable relative said fixture support, and said weight having funnels guiding said weight in its mounting emplacement on said fixture support.

References Cited by the Examiner

UNITED STATES PATENTS

| | | | |
|---|---|---|---|
| 925,086 | 6/1909 | Furniss | 240—4 |
| 1,261,894 | 4/1918 | Barnes | 240—52.1 X |
| 1,326,650 | 12/1919 | Doerr | 240—52.1 X |
| 2,455,798 | 12/1948 | Nicolaysen | 240—4 X |
| 2,459,237 | 1/1949 | Mentor | 179—91 |

NORTON ANSHER, *Primary Examiner.*

C. C. LOGAN, *Assistant Examiner.*